(12) United States Patent
Chin et al.

(10) Patent No.: US 7,795,576 B2
(45) Date of Patent: Sep. 14, 2010

(54) SINGLE DOME LENS REFLECTIVE OPTICAL ENCODER

(75) Inventors: Yee Loong Chin, Lahat (MY); Weng Fei Wong, Penang (MY); Wee Jin Yeap, Penang (MY); Cheng Kwong Cheang, Bayan Lepas (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/343,468

(22) Filed: Dec. 23, 2008

(65) Prior Publication Data

US 2010/0155586 A1    Jun. 24, 2010

(51) Int. Cl.
  *G01D 5/34*    (2006.01)
(52) U.S. Cl. .................................. 250/231.13
(58) Field of Classification Search .......... 250/231.13–231.18; 356/614, 616, 617; 341/11, 341/13
See application file for complete search history.

(56) References Cited

U.S. PATENT DOCUMENTS

| | | | |
|---|---|---|---|
| 4,451,731 A | 5/1984 | Leonard | |
| 5,317,149 A * | 5/1994 | Uebbing et al. | 250/231.14 |
| 5,825,307 A | 10/1998 | Titus et al. | |
| 5,998,784 A | 12/1999 | Venugopal et al. | |
| 6,140,636 A | 10/2000 | Norton et al. | |
| 7,182,258 B2 | 2/2007 | Foo et al. | |
| 7,385,178 B2 | 6/2008 | Chin et al. | |
| 7,394,061 B2 | 7/2008 | Saidan et al. | |
| 7,399,956 B2 | 7/2008 | Wong et al. | |
| 7,400,269 B2 | 7/2008 | Wong et al. | |
| 7,449,677 B2 | 11/2008 | Ng et al. | |
| 2006/0097051 A1* | 5/2006 | Foo et al. | 235/454 |
| 2006/0237540 A1 | 10/2006 | Saxena et al. | |
| 2007/0241943 A1* | 10/2007 | Tan et al. | 341/50 |
| 2007/0246645 A1* | 10/2007 | Wong et al. | 250/231.13 |
| 2008/0024797 A1 | 1/2008 | Otsuka et al. | |
| 2008/0111061 A1 | 5/2008 | Wong et al. | |

FOREIGN PATENT DOCUMENTS

WO    WO 2007/142403    12/2007

* cited by examiner

*Primary Examiner*—Thanh X Luu (57) ABSTRACT

Disclosed are various embodiments of high-speed, high-performance, low-noise optical encoders having various means for preventing undesired stray light from reaching light detectors incorporated therein. Structures employed to block stray light in the optical encoders include light barriers, air gap trenches, and coatings disposed between first and second sides of a substrate of the encoder. Also disclosed are compact single track optical encoders having a single dome lens disposed thereover, and dual track triple dome lens optical encoders. Methods of making such optical encoders are also disclosed.

8 Claims, 10 Drawing Sheets

SINGLE DOME LENS REFLECTIVE OPTICAL ENCODER

CROSS-REFERENCE TO RELATED APPLICATION

This patent application is submitted on the same date as U.S. patent application Ser. No. 12/343,469 entitled "Single Track Optical Encoder" to Saidan Saiful Bahari et al., the entirety of which is hereby incorporated by reference herein.

FIELD OF THE INVENTION

Various embodiments of the invention described herein relate to the field of optical encoders, and components, devices, systems and methods associated therewith.

BACKGROUND

Optical encoders are typically employed as motion detectors in applications such as closed-loop feedback control in a motor control system. Many optical encoders are configured to translate rotary motion or linear motion into a two-channel digital output for position encoding.

Many optical encoders employ an LED as a light source. In transmissive encoders, the light is collimated into a parallel beam by means of a lens located over the LED. Opposite the emitter is a light detector that typically consists of photo-diode arrays and a signal processor. When a code scale such as a code wheel or code strip moves between the light emitter and light detector, the light beam is interrupted by a pattern of bars and spaces disposed on the code scale. Similarly, in reflective or imaging encoders, the lens over an LED focuses light onto the code scale. Light is either reflected or not reflected back to the lens disposed over the photo-detector. As the code scale moves, an alternating pattern of light and dark patterns corresponding to the bars and spaces falls upon the photodiodes. The photodiodes detect these patterns and corresponding outputs are processed by the signal processor to produce digital waveforms. Such encoder outputs are used to provide information about position, velocity and acceleration of a motor, by way of example.

Transmissive optical encoders typically generate code scale images having good contrast, and hence are capable of operating at high speeds with high resolution. The high contrast characteristic of most transmissive optical encoders also permits the outputs provided thereby to be easily interpolated to higher resolution. Transmissive optical encoders usually require that light emitters be placed opposite light detectors, and thus require a relatively high profile in respect of package design.

In reflective optical encoders, the light emitter and light detector often may be placed on the same substrate, and thus low profile designs, fewer materials and shorter assembly times may be realized. Reflective optical encoders typically suffer from low contrast, which in turn leads to low speeds and low resolution.

Imaging optical encoders feature many of the same advantages as reflective optical encoders, such as low profiles and cost, but also require diffusive code wheels. In addition, imaging optical encoders suffer from low diffusive reflectance and usually cannot operate at very high speeds.

Reflective optical encoders known in the art often suffer from several performance and application problems, such as stray light originating at the light emitter hitting the light detector directly, which can cause contrast degradation, lower encoder performance, and limit resolution. Known reflective optical encoders also typically comprise one encapsulated dome with an emitter-detector pair disposed therewithin, which often leads to poor light collimation and consequent limits on encoder performance and resolution. Known reflective encoders also typically feature limited encoding capability, such as a maximum of two channels of data encoding, or a single index channel.

Various patents containing subject matter relating directly or indirectly to the field of the present invention include, but are not limited to, the following:

U.S. Pat. No. 4,451,731 to Leonard, May 29, 1984;
U.S. Pat. No. 7,182,248 to Foo et al., Jun. 10, 2008;
U.S. Pat. No. 7,385,178 to Ng et al., Nov. 11, 2008.
U.S. Pat. No. 7,400,269 to Wong et al., Jul. 15, 2008;
U.S. Pat. No. 7,394,061 to Saidan et al., Jul. 1, 2008;
U.S. Patent Publication No. 2006/0237540 to Saxena et al., Oct. 26, 2006, and
U.S. Patent No. 2008/0024797 to Otsuka et al., Jan. 21, 2008.

The dates of the foregoing publications may correspond to any one of priority dates, filing dates, publication dates and issue dates. Listing of the above patents and patent applications in this background section is not, and shall not be construed as, an admission by the applicants or their counsel that one or more publications from the above list constitutes prior art in respect of the applicant's various inventions. All printed publications and patents referenced herein are hereby incorporated by referenced herein, each in its respective entirety.

Upon having read and understood the Summary, Detailed Description and Claims set forth below, those skilled in the art will appreciate that at least some of the systems, devices, components and methods disclosed in the printed publications listed herein may be modified advantageously in accordance with the teachings of the various embodiments of the present invention.

SUMMARY

In some embodiments, there is provided a single dome lens reflective optical encoder comprising a substrate having a top surface with opposing first and second sides, a light emitter mounted on or attached to the first side and configured to emit light therefrom, a single track light detector mounted on or attached to the second side, the single track light detector comprising at least one data channel light detector and an index channel light detector, the data and index channels being arranged along a common axis, and a single dome lens comprising an optically transparent material, the single dome lens being formed over and in direct contact with the light emitter and the single track light detector such that no air gap is located between the light emitter and the dome or the light detector and the dome. The single dome lens is configured to permit light emitted from the light source to be refracted through portions thereof for reflection from a code scale comprising index and data strips that are configured to travel along the common axis. The code scale is located operably in respect of the single dome lens such that at least a portion of the light reflected from the code scale is directed towards the single dome lens and refracted through portions thereof for detection by the light detector.

In other embodiments, there is provided a method of making a single dome lens reflective optical encoder comprising providing a substrate having a top surface with opposing first and second sides, attaching a light emitter to the first side, the light emitter being configured to emit light therefrom, attaching a single track light detector to the second side, the single track light detector comprising at least one data channel light detector and an index channel light detector, the data and index channels being arranged along a common axis, attaching to the substrate an optically opaque light barrier between the light emitter and the first side and the single track light detector and the second side, the light barrier being configured to prevent or inhibit direct light rays emitted by the light emitter from impinging directly upon the single track light detector, and forming a single dome lens comprising an optically transparent material over and in direct contact with the light emitter and the single track light detector such that no air gap is located between the light emitter and the dome or the light detector and the dome. The single dome lens is configured to permit light emitted from the light source to be refracted through portions thereof for reflection from a code scale comprising index to and data strips that are configured to travel along the common axis, the code scale being located operably in respect of the single dome lens such that at least a portion of the light reflected from the code scale is directed towards the single dome lens and refracted through portions thereof for detection by the light detector.

In still other embodiments, there is provided a triple dome lens reflective optical encoder comprising a substrate having a top surface with opposing first and second sides defined by a first axis disposed therebetween, and opposing third and fourth sides defined by a second axis disposed therebetween, the first axis being substantially perpendicular to the second axis, a light emitter mounted on or attached to the first side and configured to emit light therefrom, the light emitter being covered by a first dome lens formed thereover and in direct contact therewith such that no air gap is located between the light emitter and the first dome lens, an index channel detector mounted on or attached to a first area defined by a first overlap of the second and third sides, the index channel detector being covered by a second dome lens formed thereover and in direct contact therewith such that no air gap is located between the index channel detector and the second dome lens, at least one data channel detector mounted on or attached to a second area defined by a second overlap of the second and fourth sides, the data channel detector being covered by a third dome lens formed thereover and in direct contact therewith such that no air gap is located between the data channel detector and the second dome lens. The first dome lens is configured to permit light emitted from the light source to be refracted through portions thereof for reflection from a first code scale comprising data strips as well as for reflection from a second index scale, the first code scale and the index scale being configured to travel along respective parallel third and fourth axes, the index scale being located operably in respect of the first and second dome lenses such that at least a portion of the light reflected from the index scale is directed towards the second dome lens and refracted through portions thereof for detection by the index channel detector, the code scale or code wheel being located operably in respect of the first and third dome lenses such that at least a portion of the light reflected from the code scale is directed towards the third dome lens and refracted through portions thereof for detection by the data channel detector.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME PREFERRED EMBODIMENTS

In various embodiments of the invention, single and triple dome single- and dual-track optical reflective encoder systems, devices and methods, are provided.

Figure 1:
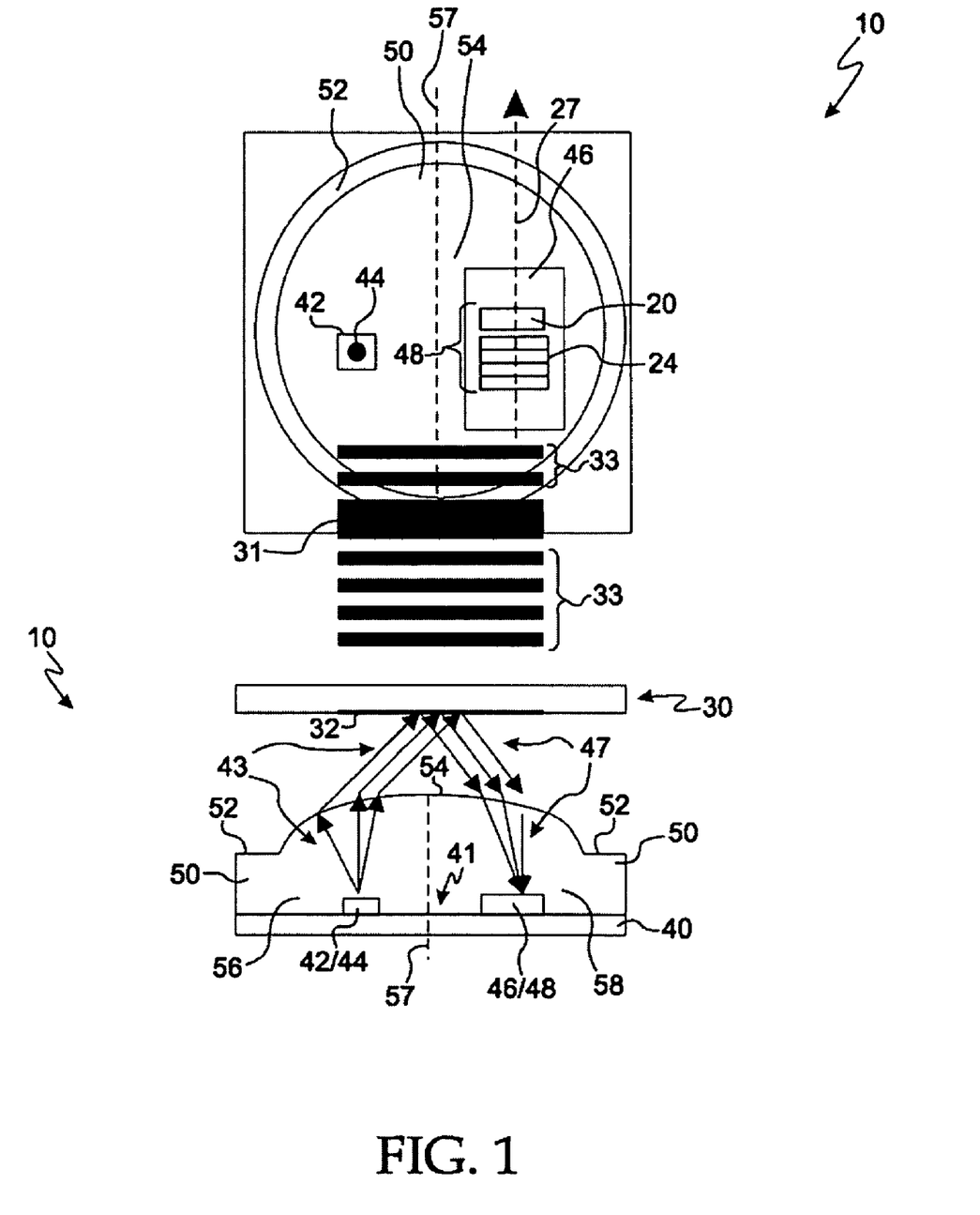
FIG. 1 shows top plan and cross-sectional views of one embodiment of a single dome lens optical encoder of the invention.

FIG. 1 shows top plan and cross-sectional views of one embodiment of a single dome lens optical encoder 10 of the invention. Substrate 40 has a top surface 41 with opposing first and second sides 56 and 58. Light emitter die 42 comprises light emitter 44 (which is configured to emit light therefrom), and is located on a first side 56 of substrate 40. Single track light detector 48 is mounted on or attached to a second side 58 of substrate 40, and comprises at least one to data channel light detector 24 and an index channel light detector 20.

As employed herein, the term "single track encoder" means an optical encoder having a single code scale having data or code patterns or bars formed or presented thereon or therein, as well as index patterns or bars formed or presented thereon or therein, where the data and index patterns travel together along a common single axis in a single track disposed over a corresponding single track comprising data channel and index channel light detectors.

The first side 56 is opposite the second side 58 on the top surface 41 of substrate 40 such that light emitted from light emitter 42/44 travels primarily from the first side 56 upwardly towards code scale 30 for reflection therefrom downwardly towards second side 58 for detection by light detector 46/48. In a preferred embodiment, and as shown in FIG. 1, single dome lens 50 comprises a curved outer lens surface 54 which is shaped and configured to direct light rays 43 and 47 away from light emitter 42/44 towards code and index scale 30 and thence back to light detector 46/48. Note that as employed herein, the term "code scale" or "code and index scale" can mean a code wheel, a code strip, a code and index wheel, or a code and index strip. Data channel light detector 24 and index channel light detector 20 are arranged along a common axis 27, which coincides with the direction of movement of code and index scale 30 disposed operably thereabove.

Continuing to refer to FIG. 1, single dome lens 50 comprises an optically transparent material, which in a preferred embodiment is a moldable epoxy. Single dome lens 50 is formed over and in direct contact with the light emitter 42/44 and single track light detector 48 such that no air gap is located between light emitter 42/44 and dome 50, or between the light detector 48 and the dome 50. The single dome lens 50 is configured to permit light 43 emitted from the light source to be refracted through portions thereof for reflection from a code and index scale 30 comprising index strips 31 and data strips 33, which is configured to travel along the common axis 27. The code and index scale 30 is located operably in respect of the single dome lens 50 such that at least a portion of the light 47 reflected from the code and index scale 30 is directed downwardly towards the single dome lens 50 and refracted through portions thereof for detection by the light detector 46/48. Note that the upper or outer surface 54 of single dome lens 50 may have a spherical, aspherical or biconic profile above one or both of the emitter 42/44 and the detector 46/48.

As further shown in FIG. 1, light detector 48 may comprise a single die 46 upon which the index channel and data channel light detectors are formed, or alternatively may comprise discrete dice for the index channel light detector and the data channel light detector, respectively. Reflective surfaces 32 formed on the underside of index strips 31 and data strips 33 are configured to permit upwardly projecting light rays 43 to be reflected therefrom to form downwardly projecting light rays 47.

Optional bevel or shoulder 52 may be formed around the outer periphery of single dome lens 50. Alternatively, the outer periphery of single dome lens 50 may be configured to project upwardly from the periphery above the uppermost portion of single dome lens 50 so as to form a protective protrusion to provide a protective ring or shoulder therearound.

Continuing to refer to FIG. 1, the data channel light detector 24 may comprise one light detector, at least two light detectors corresponding to A and A\ data channels, as is known in the art, at least four light detectors corresponding to A, B, A\ and B\ data channels, or any other number of light detectors suitable for the particular application at hand. In the embodiment shown in FIG. 1, four separate light detectors form data channel light detector 24 By way of example, substrate 40 may be a printed circuit board, a lead frame, comprise plastic or be formed from a suitable polymer.

Figure 2:
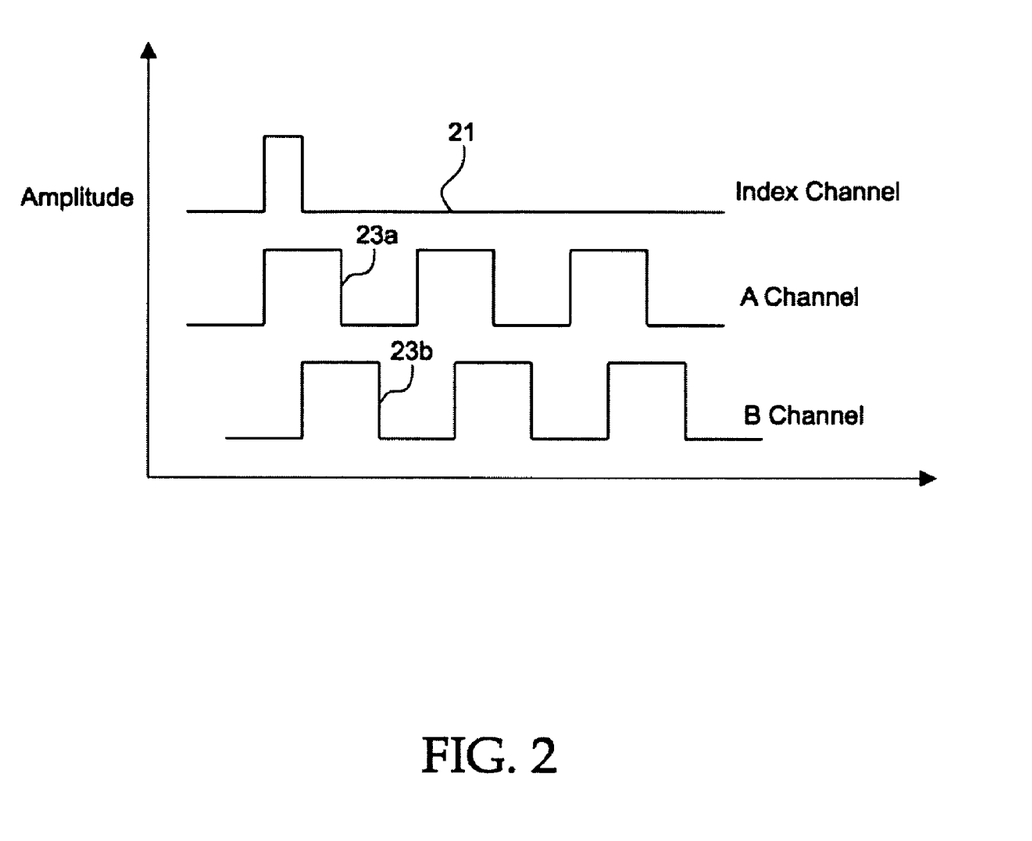
FIG. 2 shows illustrative output signals provided by the embodiment of FIG. 1.

FIG. 2 shows illustrative output signals provided by the embodiment of the optical encoder shown in FIG. 1. As shown in FIG. 2, the index channel provides an output signal 21 which is preferably shorter in duration than the output pulses 23*a* and 23*b* provided by the A and B data channels.

Figure 3:
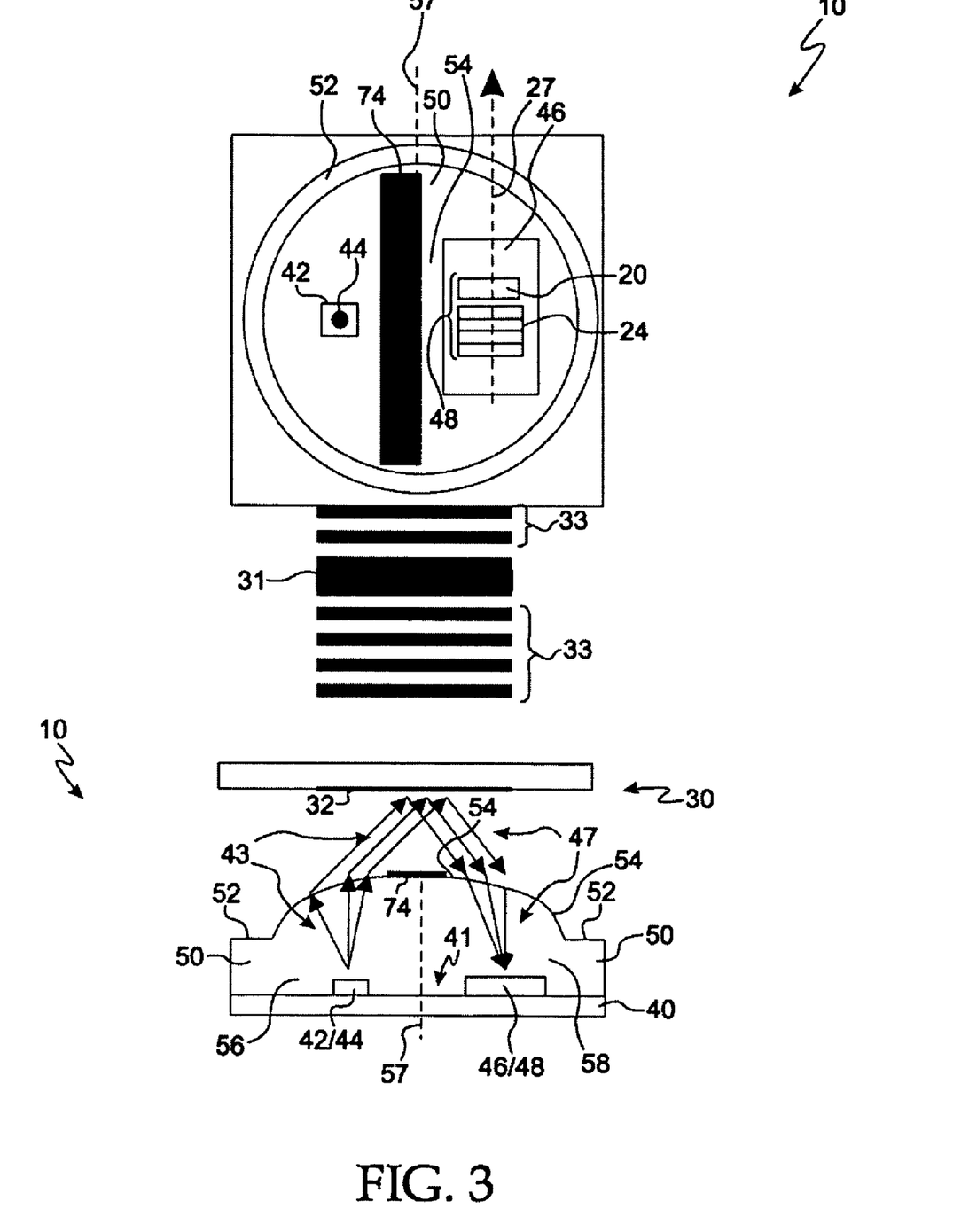
FIG. 3 shows top plan and cross-sectional views of another embodiment of a single dome lens optical encoder of the invention.

FIG. 3 shows top plan and cross-sectional views of another embodiment of single dome lens reflective optical encoder 10, where a portion 74 of the outer surface 54 of the single lens dome 50 is coated or treated to prevent or inhibit stray light rays from impinging upon the single track light detector 46/48. By way of example, stray or undesired light rays can include light rays internally reflected within single dome lens 50, light rays scattered or diffused within single dome lens 50, out-of-line light rays reflected from or scattered or diffused by code scale 30 or any other portion of optical encoder 10 or another device or component. Portion 74 of lens 50 may be formed, for example, by means of laser ablation, mechanical abrasion, or by disposing an appropriate optically absorptive or diffusive coating or material on the outer surface of lens 50. Other means known to those skilled in the art for forming an optically diffusive or absorptive portion over the top-most portion of lens 50 so as to shield the light detector 46/48 from scattered, out-of-line or otherwise undesired light rays are also contemplated and may be employed.

Figure 4:
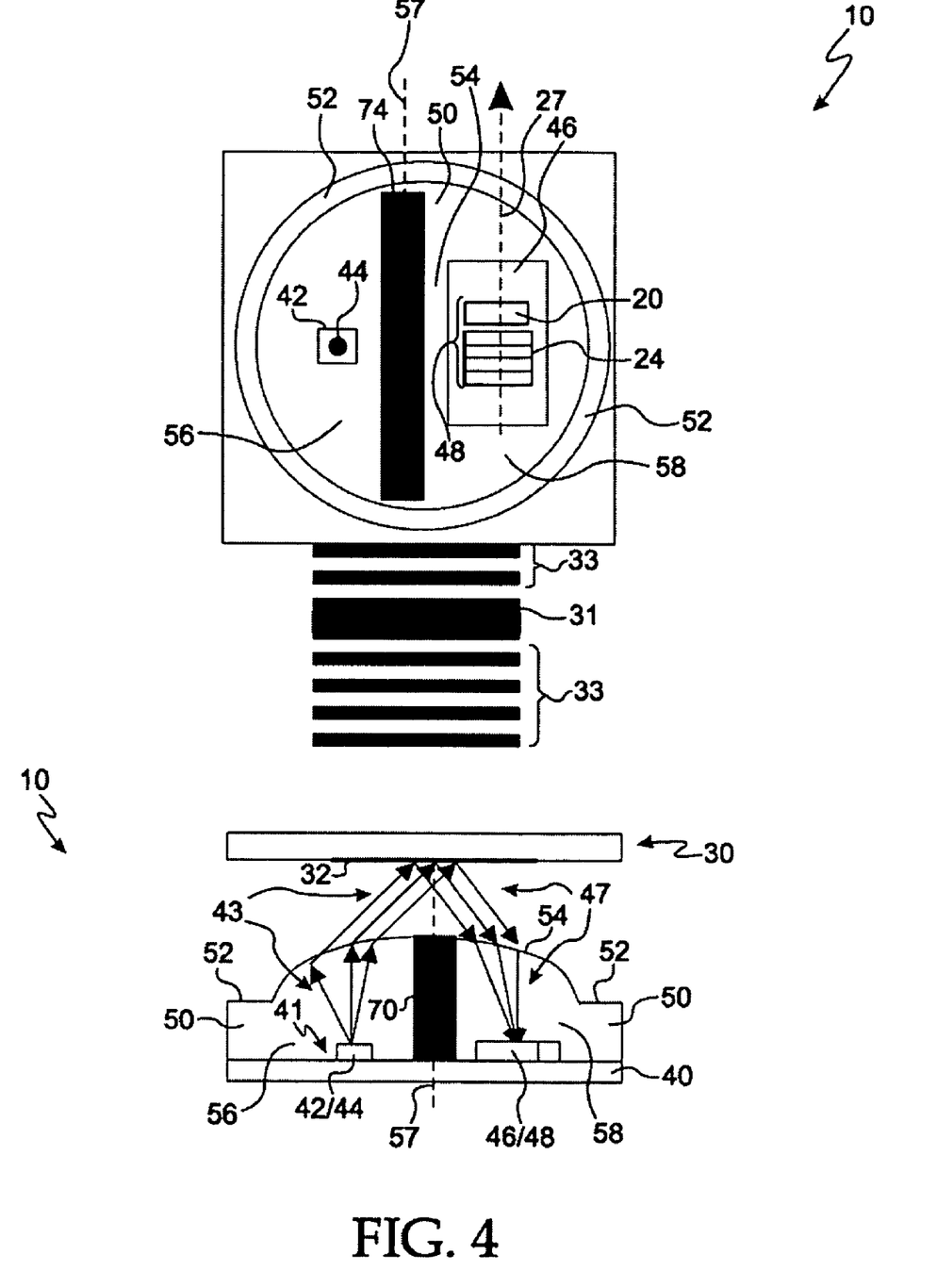
FIG. 4 shows top plan and cross-sectional views of yet another embodiment of a single dome lens optical encoder of the invention.

FIG. 4 shows top plan and cross-sectional views of yet another embodiment of single dome lens reflective optical encoder 10, which comprises an optically opaque light barrier 70 disposed between the light emitter 42/44 and the first side 56 on the one hand, and the single track light detector 46/48 and the second side 58 on the other hand. The light barrier 70 is configured to prevent or inhibit stray light rays from impinging upon the single track light detector 46/48. The embodiment shown in FIG. 4 permits the performance of optical encoder 10 to be improved in respect of prior art devices. Normally the performance of an optical encoder is affected by stray light originating from the light emitter 42/44 that propagates directly to the detector 46/48, or is reflected internally, scattered or diffused within lens 50 or by another device or component, that subsequently impinges upon the detector. The light barrier 70 prevents undesired cross-talk between the light emitter 42/44 and the light detector 46/48 from occurring. A principal source of such cross-talk is light reflecting off the internal surface defined by the upper surface 54 of lens 50 back onto detector 46/48. Stray light reduces the image contrast of the encoder, and limits the speed or frequency that can be attained. High performance optical encoders are able to achieve high levels of image contrast and resolution. By incorporating the light barrier 70 into the optical encoder 10, a higher performance optical encoder can be provided. The light barrier 70 blocks to a significant degree undesired stray light from impinging upon the light detector 46/48. As a result, the noise level of optical encoder 10 is minimized.

Continuing to refer to FIG. 4, according to one embodiment a method of making single dome lens reflective optical encoder 10 is also provided. Substrate 40 having a top surface 41 with opposing first and second sides 56 and 58 is provided or formed. Light emitter 42/44 is attached to the first side 56 of the top surface 41 of substrate 40, and single track light detector 46/48 is attached to the second side 58 of the top surface 41 such that the data and index channel detectors 20 and 24 are arranged along the common axis 27. The optically opaque light barrier 70 is formed between the light emitter 42/44 and the first side 56 on the one hand, and the single track light detector 46/48 and the second side 58 on the other hand.

Single dome lens 50 is formed over light emitter 42/44, light barrier 70 and light detector 46/48. Single dome lens 50 comprises an optically transparent material that is disposed over and in direct contact with the light emitter 42/44 and the single track light detector 46/48 such that no air gap is located between the light emitter 42/44 and the dome 50, and the light detector 46/48 and the dome 50. The single dome lens 50 is configured to permit light emitted from the light source 42/44 to be refracted through portions thereof for reflection from the code scale 30 comprising index strip 31 and data strips 33 that is configured to travel along the common axis 27.

In one method, the light barrier 70 is formed by transfer molding or insert molding. In transfer molding, the light barrier 70 is transfer molded onto substrate 40, which may be a printed circuit board, a lead frame, or the like. The light barrier 70 is preferably formed from an optically opaque, optically absorptive, optically diffusive or optically scattering material so as to block or redirect unwanted light. After transfer molding the light barrier 70 to substrate 40, die attachment and wire bonding steps are undertaken. Finally, the assembled substrate 40 having the light barrier 70 and dices 42 and 46 attached thereto and disposed thereon is placed in a mold tool and single dome lens 50 is formed thereover, preferably also using a transfer molding process.

In another method, light barrier 70 is formed by insert molding same using a high temperature plastic, and the light barrier 70 is manually placed onto the substrate 40. In a variation on such a method of transfer molding the light barrier 70, multiple cavity plastic molded light barriers are manually placed in the transfer mold tool or directly upon substrates 40 according to the particular mold tool and substrate design being employed before transfer molding single dome lenses 50. T\o provide increased accuracy and control, the light barrier 70 can be directly insert molded onto the substrate 40. Before transfer molding steps are undertaken, however, the dice 42 and 46 are attached to the substrate 40 and wire bonding is carried out. Then, the light barrier 70 is attached to the substrate 40 or inserted into the mold tool, depending on the particular molding tool and process design that is being employed. Transfer molding is next preferably employed to form the single dome lens 50 and encapsulate the dices 42 and 46 and the light barrier 70.

Figure 5A:
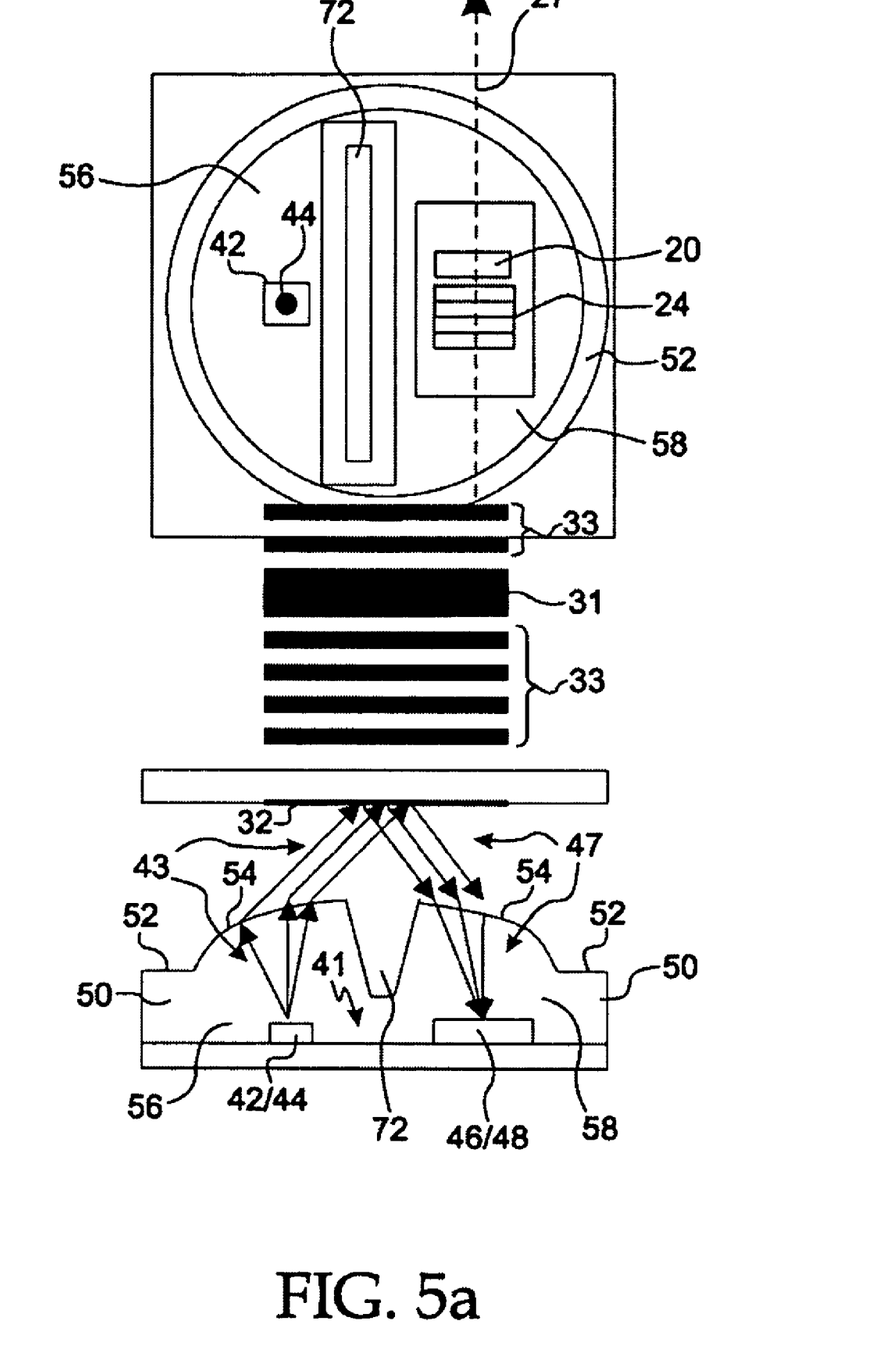
FIG. 5a shows top plan and cross-sectional views of still another embodiment of a single dome lens optical encoder of the invention.
Figure 5B:
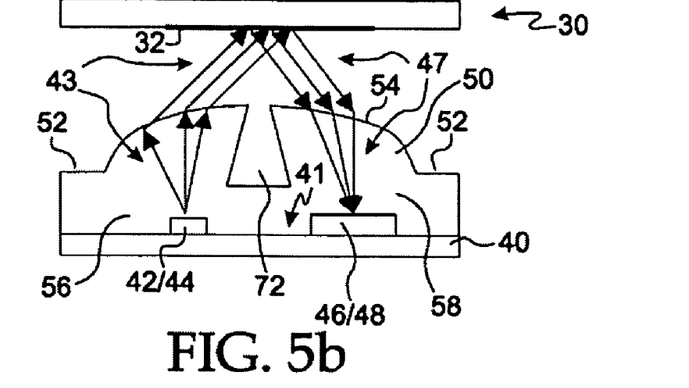
FIGS. 5b-5d shows cross-sectional views of various embodiments of single is dome lens optical encoders of the invention.

FIG. 5a shows top plan and cross-sectional views of still another embodiment of single dome lens reflective optical encoder 10. Single dome lens reflective optical encoder 10 comprises an air gap trench 72 disposed between the light emitter 42/44 and the first side 56 on the one hand, and the single track light detector 46/48 and the second side 58 on the other hand. The air gap trench 72 is configured to prevent or inhibit direct light rays emitted by the light emitter 42/44 from impinging directly upon the single track light detector 46/48. FIG. 5b shows a cross-sectional view of an alternative embodiment of a single dome lens optical encoder 10 having an air gap trench 72.

Figure 5C:
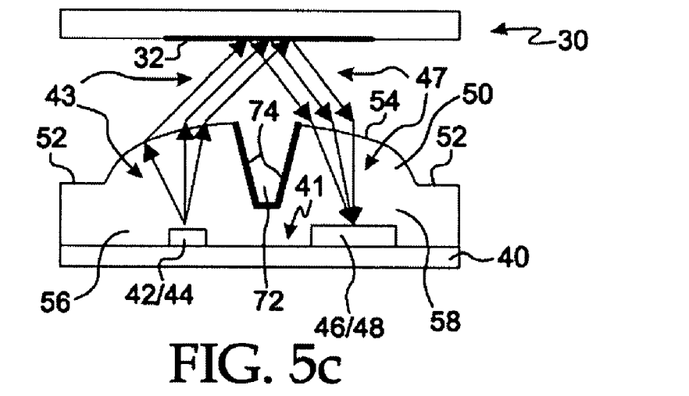
Figure 5D:
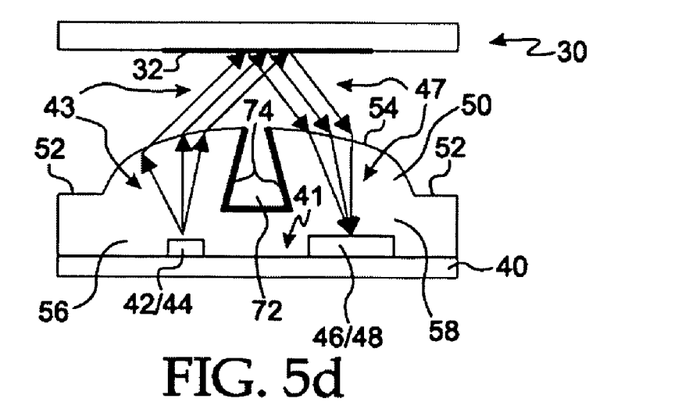

FIGS. 5c and 5d show cross-sectional views of still other embodiments of single dome lens optical encoders 10 having air gap trench 72 disposed in single dome lenses 50. In the embodiments of FIGS. 5c and 5d, portions 74 are disposed on the outer surfaces of air gap trench 72, which are coated or treated to prevent or inhibit stray light rays from impinging upon the single track light detector 46/48. Portion 74 of lens 50 may be formed, for example, by means of laser ablation, mechanical abrasion, or by disposing an appropriate optically absorptive, diffusive or scattering coating or other material on the outer surface of lens 50. Other means known to those skilled in the art for forming an optically absorptive, diffusive or scattering portion 74 over the outer surfaces of air gap trench 72 so as to shield the light detector 46/48 from scattered, out-of-line or otherwise undesired light rays are also contemplated and may be employed. Air gap trench 72 may be formed by molding, grinding, ablation, and other methods known to those skilled in the art.

Referring now to FIGS. 1 through 5d, it will be seen that the single dome lens optical encoders 10 illustrated therein can be adapted for use in Incremental optical encoders having two, three or more data channels, commutation optical encoders having six or some other number of channels, pseudo absolute optical encoders, and absolute optical encoders. In addition, the single dome lens optical encoders illustrated in FIGS. 1 through 5d are particularly well adapted for miniaturization, as the light emitter 42/44 and the single-track light detector 46/48 can be placed in close proximity to one another while still permitting stray light to be minimized or substantially eliminated. The embodiments illustrated in FIGS. 1 through 5d permit small optical encoder packages 10 to be constructed which share the same lens 50 for transmitting and receiving light. Improved performance also results, as the noise level of the encoder 10 caused by stray light impinging upon the detector is minimized or eliminated. Hence, the encoder 10 can be used in high speed rotary or linear systems. Moreover, minimal investments in manufacturing processes and equipment are required to implement low cost transfer molding processes, which are commonly employed in many semiconductor package encapsulation applications.

Figure 6A:
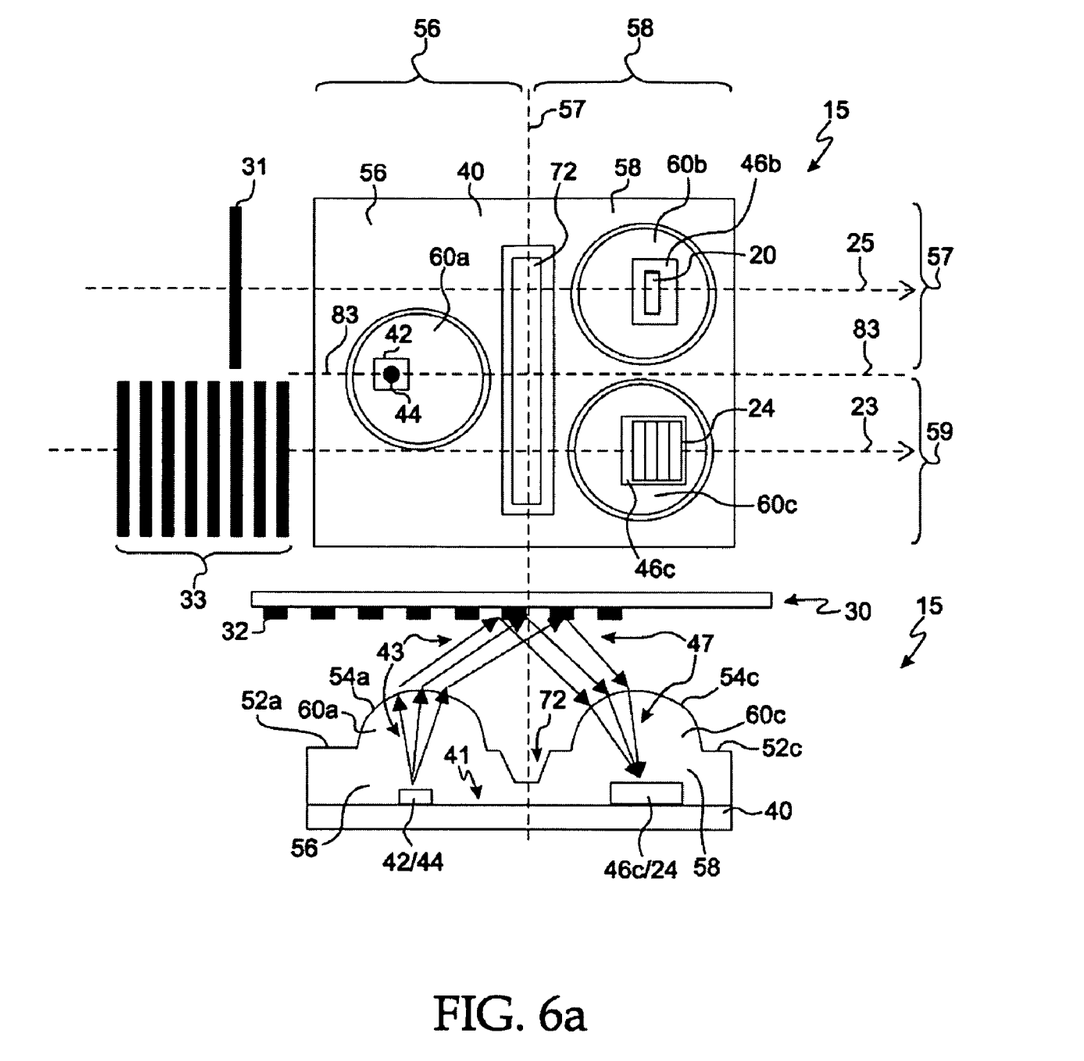
FIG. 6a shows top plan and cross-sectional views of one embodiment of a triple dome lens optical encoder of the invention.
Figure 6B:
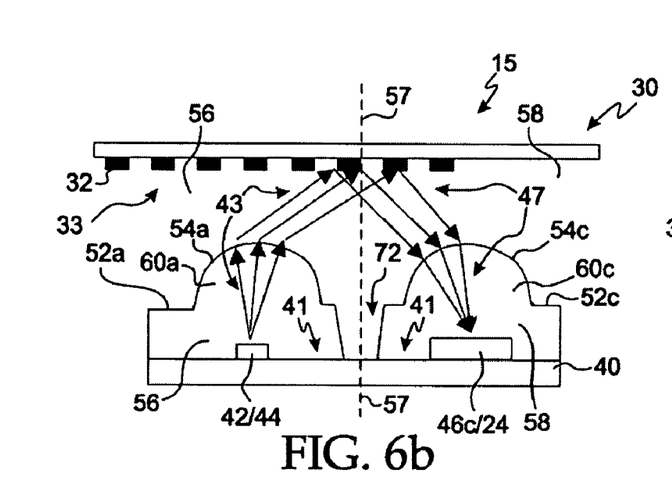
FIGS. 6b-6e show cross-sectional views of various other embodiments of triple dome lens optical encoders of the invention.

Referring now to FIG. 6a, there are shown top plan and cross-sectional views of one embodiment of a triple dome lens dual track optical encoder 15. The triple dome lens reflective optical encoder 15 comprises a substrate 40 having a top surface 41 with opposing first side 56 and second side 58 separated by a first axis 57 disposed therebetween. Opposing third side 57 and fourth side 59 are separated by a second axis 83 disposed therebetween, where the first axis 57 is substantially perpendicular to the second axis 83.

Continuing to refer to FIG. 6a, a light emitter 42/44 is mounted on or attached to the first side 56 and configured to emit light therefrom. The light emitter 42/44 is covered by a first dome lens 60a formed thereover and in direct contact therewith such that no air gap is located between the light emitter 42/44 and the first dome lens 60a. An index channel detector 20/46b is mounted on or attached to a first area defined by a first overlap of the second and third sides 58 and 57. The index channel detector 20/46b is covered by a second dome lens 60b formed over and in direct contact therewith such that no air gap is located between the index channel detector 20/46b and the second dome lens 46b.

At least one data channel detector 24/46c is mounted on or attached to a second area defined by a second overlap of the second and fourth sides 58 and 59. The data channel detector 24/46c is covered by a third dome lens 60c formed over and in direct contact therewith such that no air gap is located between the data channel detector 24/46c and the third dome lens 60c.

The first dome lens 60a is configured to permit light emitted from the light emitter 42/44 to be refracted through portions thereof for reflection from a first code scale 30 comprising data strips 33. The first dome lens 60a is further configured to permit light emitted from the light emitter 42/44 to be refracted through portions thereof for reflection from a second separate index scale having index strips 31. As shown in FIG. 6a, the first code scale 30 and the second index scale are configured to travel along respective parallel but different third and fourth axes 23 and 25.

The index scale is located operably in respect of the first and second dome lenses 60a and 60b such that at least a portion of the light reflected from the index scale is directed towards the second dome lens 60b and refracted through portions thereof for detection by the index channel detector 20/46b. The code scale 30 is located operably in respect of the first and third dome lenses 60a and 60c such that at least a portion of the light reflected from the code scale 30 is directed towards the third dome lens 60c and refracted through portions thereof for detection by the data channel detector 24/46c.

Figure 6C:
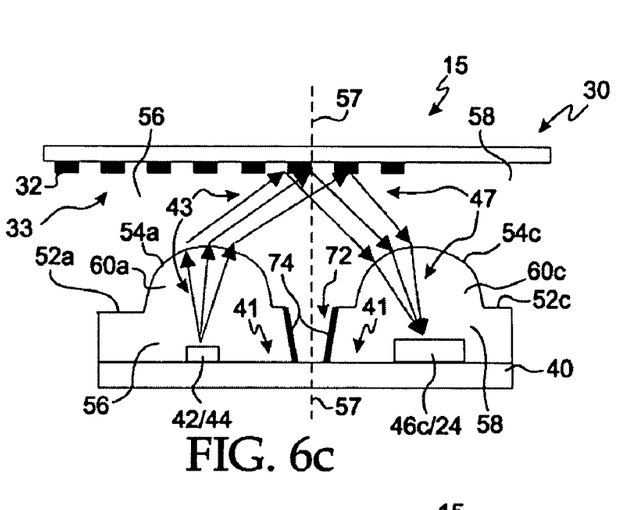
Figure 6D:
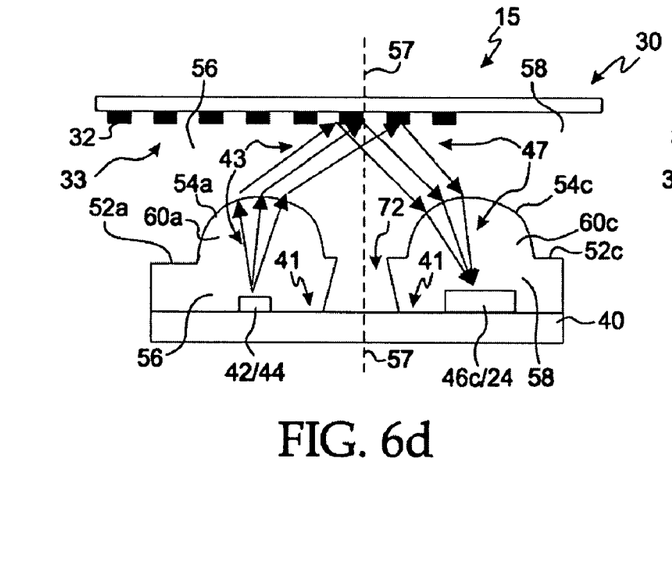
Figure 6E:
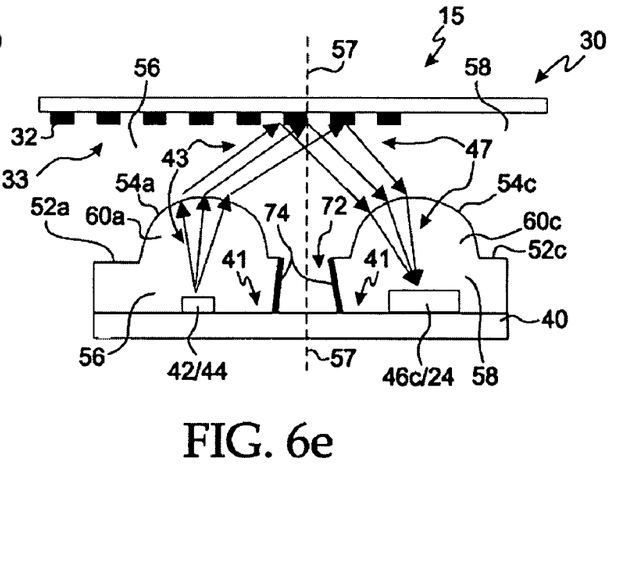

FIGS. 6b-6e show cross-sectional views of various other embodiments of triple dome lens optical encoders of the invention, where air gap trenches 72 are provided between the light emitter 42/44 and the first side 56 on the one hand, and the dual track light detectors 46b/20 and 46c/24 and the second side 58 on the other hand. Air gap trenches 72 are configured to prevent or inhibit direct light rays emitted by light emitters 42/44 from impinging directly upon the dual track light detectors 46b/20 and 46c/24. In the embodiments of FIGS. 6c and 6e, portions 74 are disposed on the outer surfaces of air gap trench 72, which are coated or treated to prevent or inhibit stray light rays from impinging upon the dual track light detectors 20 and 24. Portions 74 may be formed, for example, by means of laser ablation, mechanical abrasion, or by disposing an appropriate optically absorptive, diffusive or scattering coating or material on the outer surfaces of air gap trenches 73. Other means known to those skilled in the art for forming an optically diffusive, absorptive or scattering portion 74 over the outer surfaces of air gap trench 72 so as to shield the light detectors 46b/20 and 46c/24 from stray light rays are also contemplated and may be employed. Air gap trench 72 may be formed by molding, grinding, ablation, and other methods known to those skilled in the art.

Figure 7A:
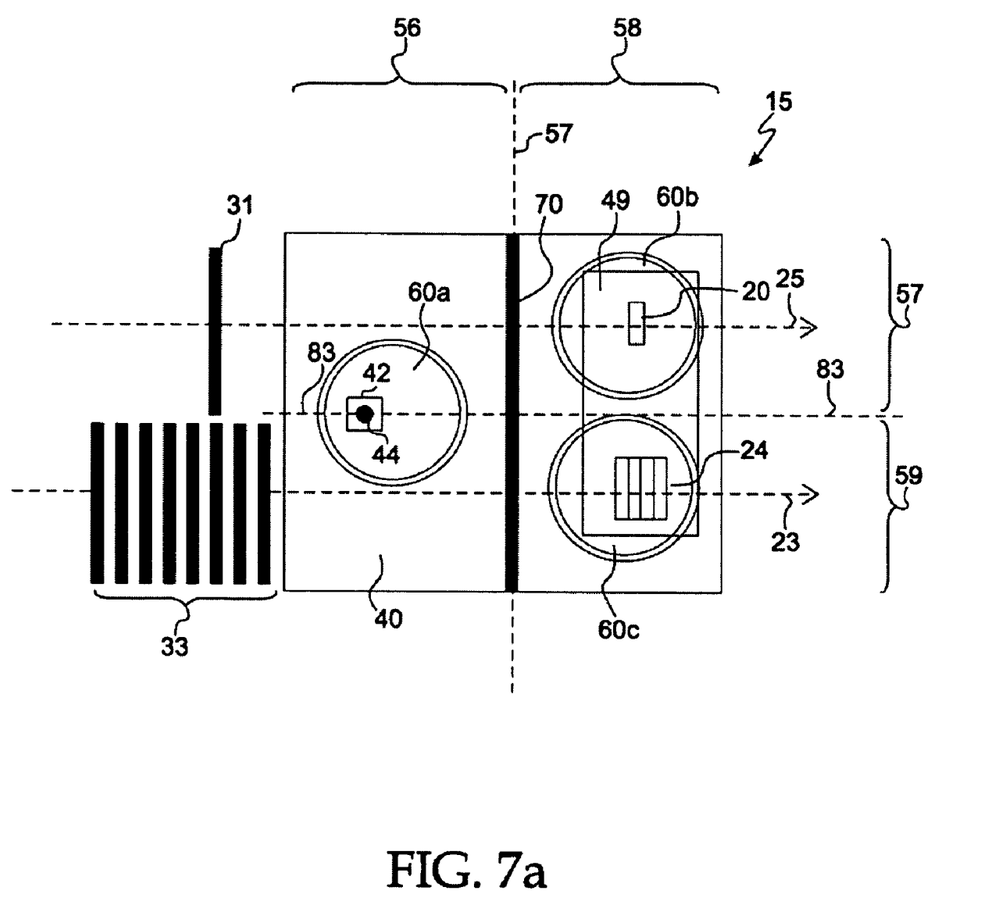
FIG. 7a shows a top plan view of another embodiment of a triple dome lens optical encoder of the invention.

Referring now to FIG. 7a, there are shown top plan and cross-sectional views of another embodiment of a triple dome lens dual track optical encoder 15. The triple dome lens reflective optical encoder 15 comprises a substrate 40 having a top surface 41 with opposing first side 56 and second side 58 separated by a first axis 57 disposed therebetween. Opposing third side 57 and fourth side 59 are separated by a second axis 83 disposed therebetween, where the first axis 57 is substantially perpendicular to the second axis 83.

Continuing to refer to FIG. 7a, a light emitter 42/44 is mounted on or attached to the first side 56 and configured to emit light therefrom. The light emitter 42/44 is covered by a first dome lens 60a formed thereover and in direct contact therewith such that no air gap is located between the light emitter 42/44 and the first dome lens 60a. An index channel detector 20/49 is mounted on or attached to a first area defined by a first overlap of the second and third sides 58 and 57. The index channel detector 20/49 is covered by a second dome lens 60b formed over and in direct contact therewith such that no air gap is located between the index channel detector 20/49 and the second dome lens 60b. At least one data channel detector 24/49 is mounted on or attached to a second area defined by a second overlap of the second and fourth sides 58 and 59. The data channel detector 24/49 is covered by a third dome lens 60c formed over and in direct contact therewith such that no air gap is located between the data channel detector 24/49 and the third dome lens 60c.

The first dome lens 60a is configured to permit light emitted from the light emitter 42/44 to be refracted through portions thereof for reflection from a first code scale 30 comprising data strips 33. The first dome lens 60a is further configured to permit light emitted from the light emitter 42/44 to be refracted through portions thereof for reflection from a second index scale having index strips 31. As shown in FIG. 7a, the first code scale 30 and the second index scale are configured to travel along respective parallel but different third and fourth axes 23 and 25. The index scale is located operably in respect of the first and second dome lenses 60a and 60b such that at least a portion of the light reflected from the index scale is directed towards the second dome lens 60b and refracted through portions thereof for detection by the index channel detector 20/49. The code scale 30 is located operably in respect of the first and third dome lenses 60a and 60c such that at least a portion of the light reflected from the code scale 30 is directed towards the third dome lens 60c and refracted through portions thereof for detection by the data channel detector 24/49.

Figure 7B:
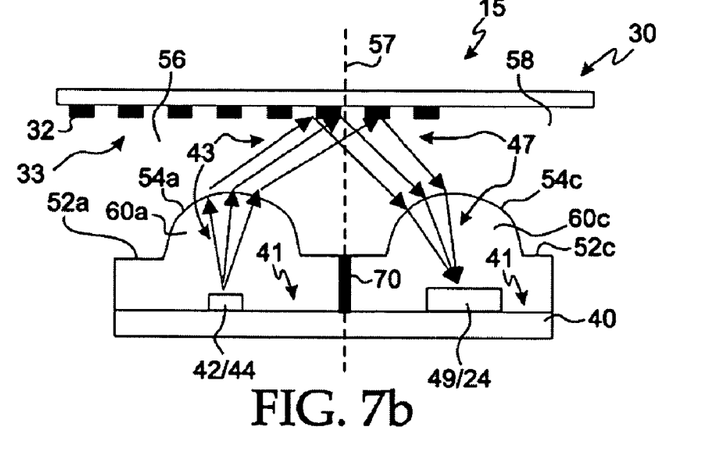
FIGS. 7b-7d show cross-sectional views of various other embodiments of triple dome lens optical encoders of the invention.
Figure 7C:
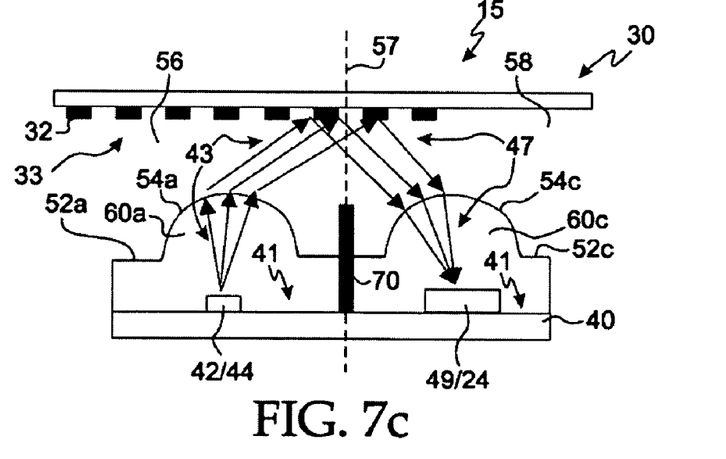

As shown in FIGS. 7a, 7b and 7c, the optically opaque light barrier light barrier 70 is disposed between the first side 56 and the second side 58, and is configured to prevent or inhibit direct light rays emitted by the light emitter 42/44 from impinging directly upon the dual track light detectors 20/49 and 24/49. The embodiment shown in FIG. 7a permits the performance of dual track optical encoder 15 to be improved. Normally the performance of an optical encoder is affected by stray light. Such stray light reduces the image contrast of the encoder, and limits the maximum speed or frequency that can be attained. High performance optical encoders are able to achieve high levels of image contrast and resolution. By incorporating the light barrier 70 into the optical encoder 15, a higher performance optical encoder can be provided. The light barrier 70 substantially blocks undesired stray light from impinging upon the light detectors 20/49 and 24/49. As a result, the noise level of optical encoder 15 is minimized.

Figure 7D:
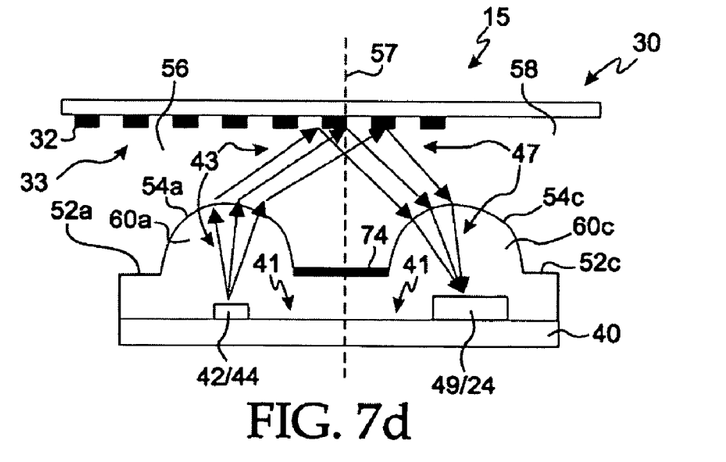

Referring now to FIG. 7d, there is shown another embodiment of a dual track optical encoder comprising portion 74 disposed between the first side 56 and the second side 58, which portion 74 is coated or treated to prevent or inhibit stray light rays from impinging upon the dual track light detectors 20/49 and 24/49. Portion 74 may be formed, for example, by means of laser ablation, mechanical abrasion, or by disposing an appropriate optically absorptive, diffusive or scattering coating or material on the outer surface of the region disposed between first dome lens 60a on the one hand, and second and third dome lenses 60b and 60c on the other hand. Other means known to those skilled in the art for forming an optically diffusive, absorptive or scattering portion 74 over the outer surface of optical encoder 15 so as to shield the light detectors 20/49 and 24/49 from stray light rays are also contemplated and may be employed.

Further as shown in FIGS. 6a through 7d, first, second and third dome lenses 60a, 60b and 60c may include at least one of a bevel 52 and a protective protrusion disposed about a periphery thereof. As shown in FIG. 7a, the at least one data channel light detector 24/49 and the index channel light detector 20/49 may be disposed upon a single die, or alternatively may comprise discrete dice containing the index channel light detector 20 and the data channel light detector 24, respectively. The outer surfaces 54a, 54b and 54c of first, second and third dome lenses 60a, 60b and 60c may be spherical, aspherical and/or biconic according to the particular application at hand. First, second and third dome lenses 60a, 60b and 60c are preferably formed from an optically transparent and moldable epoxy.

The triple dome lens reflective optical encoders shown in FIGS. 6a through 7d may be configured such that data channel light detector 24 comprises one light detector, at least two light detectors corresponding to A and B data channels, respectively, at least four light detectors corresponding to A, B, A\ and B\ data channels, respectively, or any other number of light detectors according to the particular application at hand. The substrate 40 may be a printed circuit board, a lead frame, or comprise plastic or a suitable polymer.

Included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. A single dome lens reflective optical encoder, comprising:

a printed circuit board or lead frame substrate having a top surface with opposing first and second sides;

a light emitter mounted on or attached to the first side and configured to emit light therefrom;

a single track light detector mounted on or attached to the second side, the single track light detector comprising at least four light detectors corresponding to A, B, A\ and B\ data channels and an index channel light detector, the data and index channels being arranged along a common axis;

an optically opaque light barrier disposed between the light emitter and the first side and the single track light detector and the second side, the light barrier being configured to prevent or inhibit direct light rays emitted by the light emitter from impinging directly upon the single track light detector, the light barrier being transfer or insert molded directly onto the top surface of the substrate, and a single dome lens comprising an optically transparent material, the single dome lens being formed over and in direct contact with the light emitter and the single track light detector such that no air gap is located between the light emitter and the dome or the light detector and the dome, the lens comprising a curved outer surface that is symmetric along a lens axis intersecting the common axis at a right angle thereto, the lens being transfer molded directly over the light emitter, the light detector and the light barrier;

wherein the single dome lens is configured to permit light emitted from the light source to be refracted through portions thereof for reflection from a code scale or code wheel comprising index and data strips and configured to travel along the common axis, the code scale or code wheel being located operably in respect of the single dome lens such that at least a portion of the light reflected from the code strip or code wheel is directed towards the single dome lens and refracted through portions thereof for detection by the light detector, the optical encoder further being configured to provide a first output signal corresponding to the index channel and second output signals corresponding to the A and B data channels, the first output signal having a duration less than that of the second output signals.

2. The single dome lens reflective optical encoder of claim 1, wherein an outer surface of the single lens dome is coated or treated to prevent or inhibit direct light rays emitted by the light emitter from impinging directly upon the single track light detector.

3. The single dome lens reflective optical encoder of claim 1, wherein the single dome lens further comprises at least one of a bevel and a protective protrusion disposed about a periphery thereof.

4. The single dome lens reflective optical encoder of claim 1, wherein the at least one data channel light detector and the index channel light detector are disposed upon a single die.

5. The single dome lens reflective optical encoder of claim 1, wherein the single dome lens comprises at least one of a spherical, aspherical and biconic outer lens surface.

6. The single dome lens reflective optical encoder of claim 1, wherein the single dome lens comprises epoxy.

7. The single dome lens reflective optical encoder of claim 1, wherein the substrate comprises plastic or a polymer.

8. A method of making a single dome lens reflective optical encoder, comprising:

providing a printed circuit board or lead frame substrate having a top surface with opposing first and second sides;

attaching a light emitter to the first side, the light emitter being configured to emit light therefrom;

attaching a single track light detector to the second side, the single track light detector comprising at least four light detectors corresponding to A, B, A\ and B\ data channels and an index channel light detector, the data and index channels being arranged along a common axis;

transfer or insert molding an optically opaque light barrier to the substrate between the light emitter and the first side and the single track light detector and the second side, the light barrier being configured to prevent or inhibit direct light rays emitted by the light emitter from impinging directly upon the single track light detector, and transfer or insert molding a single dome lens comprising an optically transparent material directly over and in direct contact with the light emitter and the single track light detector such that no air gap is located between the light emitter and the dome or the light detector and the dome, the lens comprising a curved outer surface that is symmetric along a lens axis intersecting the common axis at a right angle thereto, the lens being transfer molded directly over the light emitter, the light detector and the light barrier;

wherein the single dome lens is configured to permit light emitted from the light source to be refracted through portions thereof for reflection from a code scale or code wheel comprising index and data strips and configured to travel along the common axis, the code scale or code wheel being located operably in respect of the single dome lens such that at least a portion of the light reflected from the code strip or code wheel is directed towards the single dome lens and refracted through portions thereof for detection by the light detector, the optical encoder further being configured to provide a first output signal corresponding to the index channel and second output signals corresponding to the A and B data channels, the first output signal having a duration less than that of the second output signals.

* * * * *